United States Patent [19]
DiZio et al.

[11] Patent Number: 5,990,238
[45] Date of Patent: Nov. 23, 1999

[54] RELEASE COATING FOR ADHESIVE ARTICLES AND METHOD

[75] Inventors: James P. DiZio, St. Paul; Roy Wong, White Bear Lake; Hildegard M. Schneider, St. Paul, all of Minn.

[73] Assignee: 3M Innovative Properties Company, St. Paul, Minn.

[21] Appl. No.: 08/934,263

[22] Filed: Sep. 19, 1997

[51] Int. Cl.$^6$ ....................................................... C08F 8/30
[52] U.S. Cl. ........................... 525/60; 525/61; 525/326.7; 525/327.6; 525/329.4; 525/329.6; 525/329.8; 525/329.9; 525/330.4; 525/330.5; 525/331.5; 525/340; 525/343; 525/353; 525/367; 525/369; 525/374
[58] Field of Search ............................ 525/60, 61, 326.7, 525/327.6, 329.4, 329.6, 329.8, 329.9, 330.4, 330.5, 331.5, 340, 343, 353, 367, 369, 374

[56] References Cited

U.S. PATENT DOCUMENTS

| | | |
|---|---|---|
| 2,532,011 | 11/1950 | Dahlquist et al. . |
| 2,607,711 | 8/1952 | Hendricks . |
| 2,829,073 | 4/1958 | Williams . |
| 2,876,894 | 3/1959 | Dahlquist et al. . |
| 2,913,355 | 11/1959 | Collins . |
| 3,051,588 | 8/1962 | Lavanchy . |
| 3,052,566 | 9/1962 | Smith . |
| 3,285,771 | 11/1966 | Dabroski . |
| 3,342,625 | 9/1967 | Grossman et al. . |
| 3,475,196 | 10/1969 | Bartell et al. . |
| 3,502,497 | 3/1970 | Crocker . |
| 3,510,342 | 5/1970 | Demmig et al. . |
| 3,928,690 | 12/1975 | Settineri et al. . |
| 4,241,198 | 12/1980 | Kobayashi . |
| 4,299,741 | 11/1981 | Doehnert . |
| 4,342,815 | 8/1982 | Doehnert . |
| 4,622,360 | 11/1986 | Gomi et al. . |
| 4,973,513 | 11/1990 | Riedel . |
| 5,032,460 | 7/1991 | Kantner et al. . |
| 5,089,336 | 2/1992 | Kumar et al. . |
| 5,128,412 | 7/1992 | Miyasaka et al. . |
| 5,202,190 | 4/1993 | Kantner et al. . |
| 5,225,480 | 7/1993 | Tseng et al. . |
| 5,350,631 | 9/1994 | Tseng et al. . |
| 5,356,706 | 10/1994 | Shores . |
| 5,516,865 | 5/1996 | Urquiola . |

FOREIGN PATENT DOCUMENTS

| | | |
|---|---|---|
| 0 086 406 A1 | 8/1983 | European Pat. Off. . |
| 0 303 416 | 2/1989 | European Pat. Off. . |
| 0 409 218 A2 | 1/1991 | European Pat. Off. . |
| 0 448 399 A2 | 9/1991 | European Pat. Off. . |
| 0 484 093 A2 | 5/1992 | European Pat. Off. . |
| 0 606 532 A1 | 7/1994 | European Pat. Off. . |
| 0 620 235 A2 | 10/1994 | European Pat. Off. . |
| 57-061061-A | 4/1982 | Japan . |
| 60 090 672 | 5/1985 | Japan . |
| 61-126191-A | 6/1986 | Japan . |
| 03086776 | 4/1991 | Japan . |
| 03086777 | 4/1991 | Japan . |
| 03086778 | 4/1991 | Japan . |
| 03086779 | 4/1991 | Japan . |
| 06192341 | 7/1994 | Japan . |
| WO 93/11933 | 6/1993 | WIPO . |
| WO 97/31042 | 8/1997 | WIPO . |

*Primary Examiner*—Bernard Lipman
*Attorney, Agent, or Firm*—Scott A. Bardell

[57] ABSTRACT

A polymer includes an ethylene-containing backbone having substituents attached thereto, wherein the substituents include a urethane linked nitrogen-bonded hydrocarbon side chain having about 5 carbon atoms or more in length and a terminal methyl group; and an oxygen linked water solubilizing group. The polymer is particularly useful in a release coating composition and is suitable for forming films from aqueous dispersions thereof, organic solvent dispersions thereof, or mixtures thereof.

56 Claims, 1 Drawing Sheet

RELEASE COATING FOR ADHESIVE ARTICLES AND METHOD

BACKGROUND OF THE INVENTION

Normally tacky and pressure sensitive adhesive (PSA) materials have been used for well over half a century. Products of this type, which take the form of tapes, labels, and other types of adhesive coated sheets, must be protected from unintended adhesion to other surfaces. Hence, tapes are typically wound into a roll on their own backing and labels are typically laminated to a release sheet to prevent their accidental adhesion to other surfaces and also to prevent their contamination with air-borne dust and other contaminants. In order to allow a roll of tape to be unwound without the undesirable transfer of adhesive to the tape baking, it is customary to provide the tape backing with a low adhesion backsize (LAB). Similarly, the release sheet or liner, to which the adhesive coated label is typically laminated, is supplied with a release coating to permit the easy removal of the liner from the label. This LAB or release coating is expected to reproducibly provide an appropriate level of release to the adhesive of interest, to not deleteriously affect the adhesive, and to be resistant to aging so that the release level remains relatively predictable with time.

The *Handbook of Pressure Sensitive Adhesive Technology*, 2nd Ed., D. Satas Ed., Van Nostrand Reinhold, N.Y., 1989, Chapter 23, describes polymers which may be used as release agents for PSA tapes. Various polymers of lower critical surface tension such as silicones, fluorine-containing polymers, and long alkyl chain branched polymers are useful as release coatings. Long alkyl chain branched polymers are waxy compounds that can be used to prepare release coatings of medium release value which are especially desirable for PSA tapes. Many release coating patents describe the use of such long alkyl chain branched polymers. For example, Hendricks, U.S. Pat. No. 2,607,711 (1952) describes the use of copolymers of alkyl acrylate and acrylic acid for tape release coatings. According to Hendricks, all acrylates having an alkyl side chain of 16–20 carbon atoms are the more suitable, with octadecyl acrylate being the preferred comonomer.

Examples of other long alkyl chain branched polymers or copolymers include stearyl methacrylate-acrylonitrile copolymer (U.S. Pat. No. 3,502,497); copolymers of stearyl acrylate or methacrylate with other monomers (U.S. Pat. No. 4,241,198); polyvinyl esters such as polyvinyl stearate, polyvinyl palmitate, polyvinyl arachidate, and polyvinyl behenate (U.S. Pat. No. 2,829,073); stearyl maleate-vinyl acetate copolymer (U.S. Pat. No. 3,285,771); polyvinyl stearate, polyvinyl laurate, copolymers of vinyl stearate with vinyl acetate and maleic anhydride, copolymers of octadecyl acrylate with other monomers (U.S. Pat. No. 2,913,355); polyethylene imines acylated with higher fatty acids (U.S. Pat. No. 3,510,342); poly-N-acyl imine (U.S. Pat. No. 3,475,196); solution polymers of vinyl stearate, allyl stearate, or vinyl octadecyl ether with maleic anhydride (U.S. Pat. No. 2,876,894); N-stearyl polyacrylamide (U.S. Pat. No. 3,051,588); solution polymerized stearyl itaconate, monoacetyl itaconate, and monobehenyl itaconate (U.S. Pat. No. 3,052,566); copolymers of N-substituted long straight chain allyl maleamic acids and vinyl monomers (U.S. Pat. No. 3,342,625); and polyvinyl N-octadecyl carbamate prepared by reacting polyvinyl alcohol and octadecyl isocyanate (U.S. Pat. No. 2,532,011).

Other known release coating systems include an organic solvent based polymerization of a vinyl monomer of the general formula $CH_2=CR'COO(CH_2CHR''O)_nCONHR'''$ wherein R' and R'' each represent a hydrogen or methyl group, R''' represents an alkyl group of at least 12 carbon atoms or a fluoroalkyl group of at least 6 carbon atoms, and n is an integer of 1 to 6. Also known is the polymerization of the vinyl monomer with other vinyl compounds that does not include the preparation of water-borne LABs or release coatings from such monomers. Other known release coating systems include those that use surfactants (emulsifiers) in the stabilization of the polymer. For example, U.S. Pat. No. 5,516,865 (Urquiola) describes a water-borne polymer composition having latex particles formed by emulsion polymerization including an emulsifier at a concentration of about 0.5 to about 8 weight percent based on the total weight of all monomers. The latex particles are formed by emulsion polymerizing long alkyl chain (meth)acrylate monomers and short alkyl chain (meth)acrylate monomers. U.S. Pat. No. 5,225,480 (Tseng et al.) describes a water-borne low adhesion backsize and release coating latex composition prepared by emulsion polymerization including about 0.05 to about 4 weight percent of an emulisifier. The latex particles are stabilized by the emulsifier within the aqueous phase.

SUMMARY OF THE INVENTION

One aspect of the present invention is a release coating composition including a polymer containing a polyethylene backbone having substituents attached thereto. Preferably, the substituents include a urethane linked nitrogen-bonded hydrocarbon side chain having about 5 carbon atoms or more in length and a terminal methyl group; and an oxygen linked water solubilizing group. The substituents may further include hydrogen; a hydroxyl; a halide; an alkylene, an alkenylene, an alkynylene, an arylene group, or mixtures thereof, having a terminal hydroxyl group;

—O—$R^5$; —$R^6$; or mixtures thereof; wherein each $R^4$, $R^5$, and $R^6$ is independently selected from the group of an aliphatic group, an aromatic group, and mixtures thereof.

A water solubilizing group is a functionality capable of being ionized or is the ionized form thereof, which can either be anionic or cationic. For example, the water solubilizing group may include an acidic group capable of forming an anionic species. Preferably, when the water solubilizing group contains an anion, it is selected from the group of —$OSO_2O^-$, —$SO_2O^-$, —$CO_2^-$, (—O)$_2$P(O)O$^-$, —OP(O)(O$^-$)$_2$, —P(O)(O$^-$)$_2$, —P(O$^-$)$_2$, and —PO(O$^-$)$_2$. Equally preferable is a water solubilizing group containing a cation selected from the group of —NH($R^8$)$_2^+$ and —N($R^8$)$_3^+$, wherein $R^8$ is selected from the group of a phenyl group; a cycloaliphatic group; and a straight or branched aliphatic group having about 1 to about 12 carbon atoms.

A release coating composition of the invention may be coated from an organic solvent, water, or mixtures thereof. Thus, the release coating composition may contain organic solvents, preferably selected from the group of an aromatic hydrocarbon, an ester, an aliphatic hydrocarbon, an alcohol, a ketone, and mixtures thereof; or it may contain water.

As used herein, "release coating" refers to a component, preferably a film, that exhibits low adhesion to an adhesive, such as a pressure sensitive adhesive (PSA), so that separation occurs substantially between the adhesive and release coating interface. A release coating is also referred to as "low adhesion backsize" or LAB. Release coatings can be used in adhesive tape rolls, where the tape is wound upon itself and usage requires unwinding of the tape roll. Release coatings can also be used as a "liner" for other adhesive articles such as labels or medical dressing bandages, where the adhesive article is generally supplied as a sheet-like construction, as opposed to a roll construction.

Optionally, a release coating composition of the present invention may further include an optional additive. Preferred optional additives are selected from the group of a crosslinker; a defoamer; a flow and leveling agent; a colorant; an adhesion promoter; a plasticizer; a thixotropic agent; a rheology modifier; a film former; a biocide/anti-fungal agent; a corrosion inhibitor; an antioxidant; a surfactant/emulsifier; an extender (e.g., polymeric emulsion, thickener, filler); and mixtures thereof. A preferred optional additive is an extender.

In another aspect of the present invention, a release coating composition includes a polymer including a vinyl-derived backbone having substituents attached thereto. Preferably, the substituents include a urethane linked nitrogen-bonded hydrocarbon side chain having about 5 carbon atoms or more in length and a terminal allyl group; and an oxygen linked water solubilizing group, as defined above, wherein the release coating composition comprises about 0.5% by weight or less of a surfactant.

Preferably, the vinyl-derived backbone is formed from one or more precursor compounds, which are selected from the group of ethylene, vinyl halides, vinyl ethers, vinyl esters, acrylic esters, methacrylic esters, (meth)acrylic acid, amides, aromatic vinyl compounds, heterocyclic vinyl monomers, allyl compounds, esters and half esters of diacids, and mixtures thereof. More preferably, the vinyl-derived backbone is a polymeric backbone component selected from the group of partially or fully hydrolyzed polyvinyl acetate, partially or fully hydrolyzed ethylene/vinyl acetate, and mixtures thereof.

In yet another aspect of the invention, a composition for forming a release coating is provided, wherein the composition includes a polymer formed by combining a polymeric backbone component (e.g., hydrolyzed polyvinyl acetate) with an isocyanate-containing hydrocarbon having about 5 carbon atoms or more and a terminal methyl group and a water solubilizing compound. Optionally, a polymeric backbone component can be prepared by combining 1 or more precursors prior to combining with an isocyanate-containing hydrocarbon and/or a water solubilizing compound.

In one preferred embodiment of the release coating composition of the present invention, a polymer includes units of the following formula:

wherein each $R^1$ is independently selected from the group of hydrogen and an aliphatic group; and each R is independently selected from the group of X; a urethane-linked hydrocarbon of the formula:

wherein q is about 5 or more; and an oxygen linked water solubilizing group of the formula:

wherein each $R^3$ is independently a divalent organic linking group and m is 0 or 1; and the X moiety is selected from the group of hydrogen; a hydroxyl group; a halide; an alkylene, an alkenylene, an arylene group, and mixtures thereof, having a terminal hydroxyl group;

—O—$R^5$; or —$R^6$; wherein each $R^4$, $R^5$, and $R^6$ is independently selected from the group of an aliphatic group, an aromatic group, or mixtures thereof; and further wherein each Y moiety independently comprises a functionality capable of being ionized or is the ionized form thereof; with the proviso that the polymer contains at least one each of the urethane linked hydrocarbon group and the oxygen linked water solubilizing group.

In a further embodiment of the present invention, a release coating composition comprising a polymer comprising:

wherein each $R^1$ is independently selected from the group of hydrogen and an aliphatic group; each X is independently selected from the group of hydrogen; a hydroxyl group; a halide; an alkylene, an alkenylene, an arylene group, or mixtures thereof, having a terminal hydroxyl group;

—O—$R^5$; and —$R^6$; wherein each $R^4$, $R^5$, and $R^6$ is independently selected from the group of an aliphatic group, an aromatic group, and mixtures thereof; and wherein each $R^3$ is independently a divalent organic linking group and each Y is independently a functionality capable of being ionized or is the ionized form thereof, and further wherein q is about 5 or more; m is 0 or 1; x is about 0 to about 70; y is about 5 to about 95; and z is about 5 to about 50. Optionally, a release coating composition may further include an additive, as described above.

Another aspect of the present invention provides a method for making a polymer. One preferred method includes the steps of admixing a polymeric backbone component and at least one organic solvent; adding an isocyanate-containing hydrocarbon having at least about 5 carbon atoms in length and a terminal methyl group to the admixture to modify the polymeric backbone component; and adding a water solubilizing compound to the admixture to modify the polymeric backbone component.

Preferably, one or more precursors of the polymeric backbone component are selected from the group of ethylene, vinyl halides, vinyl ethers, vinyl esters, acrylic esters, methacrylic esters, (meth)acrylic acid, amides, aromatic vinyl compounds, heterocyclic vinyl monomers, allyl compounds, esters and half esters of diacids, and mixtures thereof. Preferably, the polymeric backbone component is selected from the group of partially or fully hydrolyzed polyvinyl acetate, partially or fully hydrolyzed ethylene/vinyl acetate, and mixtures thereof.

A suitable water solubilizing compound is preferably capable of forming a water solubilizing group including an anionic group comprising an anion selected from the group of —OSO$_2$O$^-$, —SO$_2$O$^-$, —CO$_2^-$, (—O)$_2$P(O)O$^-$; —OP(O)(O$^-$)$_2$, —P(O)(O$^-$)$_2$, —P(O$^-$)$_2$, and —PO(O$^-$)$_2$, once the water solubilizing compound modifies the polymeric backbone component. Similarly, another suitable water solubilizing compound is preferably capable of forming a water solubilizing group including a cationic group comprising a cation selected from the group of —NH($R^8$)$_2^+$ and —N($R^8$)$_3^+$, wherein $R^8$ is selected from the group of a phenyl group; a cycloaliphatic group; and a straight or branched aliphatic group having about 1 to about 12 carbon atoms. Accordingly, a preferable water solubilizing compound is selected from the group of succinic anhydride, maleic anhydride, glutaric anhydride, phthalic anhydride, 2-sulfobenzoic acid cyclic anhydride, and mixtures thereof.

In a method of making a polymer according to the present invention, a preferred organic solvent is selected from the group of an aromatic hydrocarbon, N-methyl-2-pyrrolidinone, dimethylformamide, diglyme, and mixtures thereof. Additionally, a method may further include a step of adding an optional additive selected from the group of a crosslinker; a defoamer; a flow and leveling agent; a colorant; an adhesion promoter; a plasticizer; a thixotropic agent; a rheology modifier; a film former; a biocide/anti-fungal agent; a corrosion inhibitor; an antioxidant; a surfactant/emulsifier; an extender; and mixtures thereof. Preferably, the method of the invention further includes a step of adding an optional additive comprising an extender to the release composition.

In the method of the present invention, it may be desirable to add a salt forming compound, a solvent, and water; and remove the organic solvent to form an aqueous dispersion of the release coating composition. As used herein, an "aqueous dispersion" of a composition includes within its scope a composition that is dispersible, partially soluble, or readily soluble in water. Thus, a "dispersion" as used herein includes a "solution." Preferably, the salt forming compound may either be an organic base or an inorganic base. Preferable organic bases include tertiary amines. Preferable inorganic bases include hydroxides or carbonates of alkali metals. More preferable salt forming compounds are selected from the group of ammonia, ammonium hydroxide, trimethylamine, triethylamine, tripropylamine, triisopropylamine, tributylamine, triethanolamine, diethanolamine, dimethylethanolamine, and mixtures thereof.

A further aspect of the present invention is an article including a backing having a first major surface and a second major surface; a pressure sensitive adhesive coated on the first major surface of the backing; and a low adhesion backsize coated on the second major surface. Preferably, a low adhesion backsize is formed from a release coating composition including a polymer containing an ethylene-containing backbone having substituents attached thereto. Preferably, the substituents include a urethane linked nitrogen-bonded hydrocarbon side chain having about 5 carbon atoms or more in length and a terminal methyl group; and an oxygen linked water solubilizing group, as described above.

Another aspect of the present invention provides a polymer containing a vinyl-derived backbone having substituents attached thereto. Preferably, the substituents include a urethane linked nitrogen-bonded hydrocarbon side chain having about 5 carbon atoms or more in length and a terminal alkyl group; and an oxygen linked water solubilizing group, as described above.

Yet another aspect of the present invention is a polymer including repeat units of the following formula:

wherein each $R^1$ is independently selected from the group of hydrogen and an aliphatic group; and each R is independently selected from the group of X; a urethane-linked hydrocarbon of the formula:

wherein q is about 5 or more; and an oxygen linked water solubilizing group of the formula:

wherein the X moiety is selected from the group of hydrogen; a hydroxyl group; a halide; an alkylene, an alkenylene, an arylene group, or mixtures thereof, having a terminal hydroxyl group;

—O—R$^5$; and —R$^6$; wherein each R$^4$, R$^5$, and R$^6$ is independently selected from the group of an aliphatic group, an aromatic group, and mixtures thereof, and further wherein each R$^3$ is independently a divalent organic linking group, m is 0 or 1, and each Y moiety independently comprises a functionality capable of being ionized or is the ionized form thereof; with the proviso that the polymer contains at least one each of the urethane linked hydrocarbon group and the oxygen linked water solubilizing group.

Still another aspect of the present invention provides a polymer including the following structure:

wherein each R$^1$ is independently selected from the group of hydrogen and an aliphatic group; each X is independently selected from the group of a hydrogen; a hydroxyl group; a halide; an alkylene, an alkenylene, an arylene group, or mixtures thereof, having a terminal hydroxyl group;

—O—R$^5$; and —R$^6$; wherein each R$^4$, R$^5$, and R$^6$ is independently selected from the group of an aliphatic group, an aromatic group, and mixtures thereof; and wherein each R$^3$ is independently a divalent organic linking group and each Y is independently a functionality capable of being ionized or is the ionized form thereof; and further wherein q is about 5 or more; m is 0 or 1; x is about 0 to about 70; y is about 5 to about 95; and z is about 5 to about 50.

Another aspect of the present invention is an article including a porous backing having a first major surface and a second major surface; a pressure sensitive adhesive coated on the first major surface of the backing; and a low adhesion backsize coated on the second major surface. Preferably, the low adhesion backsize is formed from a release coating composition including a polymer containing an ethylene-containing backbone having substituents attached thereto. The substituents include, but are not limited to, a urethane linked nitrogen-bonded hydrocarbon side chain having about 5 carbon atoms or more in length and a terminal methyl group; and an oxygen linked water solubilizing group. Such an article may be a medical tape, or may include a hypoallergenic pressure sensitive adhesive.

DETAILED DESCRIPTION OF PREFERRED EMBODIMENTS

A composition in accordance with the invention includes a polymer having an ethylene-containing (e.g., vinyl-derived) backbone with substituents attached thereto. The polymer comprises repeat units of the following formula:

$$-\!\!\left[\text{CH}_2-\underset{\underset{R}{|}}{\overset{\overset{R^1}{|}}{C}}\right]\!\!-$$

wherein in the polymer each R$^1$ is independently selected from the group of hydrogen and an aliphatic group (preferably having 1 to 4 carbon atoms); and wherein each R is independently selected from the group of X, which can be hydrogen, a halide, or an organic group optionally containing heteroatoms or functional groups; a urethane linked nitrogen bonded hydrocarbon group, such as that shown by the following structure:

wherein q is about 5 or more; and an oxygen linked water solubilizing group, such as that shown by the following structure:

wherein each R$^3$ is independently a divalent organic linking group (preferably having 1 to 20 carbon atoms), which includes aromatic groups and optionally heteroatoms or functional groups within the organic group, m is 0 or 1, and each Y is independently a functionality capable of being ionized or is the ionized form thereof, with the proviso that the polymer contains at least one each of the urethane linked nitrogen bonded hydrocarbon group and the oxygen bonded water solubilizing group.

As used herein, the terms "organic group" and "organic linking group" means a hydrocarbon group that is classified as an aliphatic group, cyclic group, or combination of aliphatic and cyclic groups (e.g., alkaryl and aralkyl groups). In the context of the present invention, the term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term

"alicyclic group" means a cyclic hydrocarbon group having properties resembling those of aliphatic groups. The term "aromatic group" or "aryl group" means a mono- or polynuclear aromatic hydrocarbon group. Such organic groups or organic linking groups, as used herein, include heteroatoms (e.g., O, N, or S atoms), as well as functional groups (e.g., carbonyl groups).

Preferably, each X moiety is independently selected from the group of hydrogen; a hydroxyl group; a halide; an alkylene, an alkenylene, an alkynylene, an arylene group, or mixture thereof, having a terminal hydroxyl group (preferably having 1 to 10 carbon atoms);

—O—$R^5$; and —$R^6$; wherein each $R^4$, $R^5$, and $R^6$ is independently selected from the group of an aliphatic group, an aromatic group, and mixtures thereof, optionally containing heteroatoms or functional groups. Preferably, each $R^4$, $R^5$, and $R^6$ independently has 1 to 20 carbon atoms.

Because each Y moiety is independently a functionality capable of being ionized or is the ionized form thereof, the polymer is capable of being dissolved or dispersed in water. Accordingly, a polymer of the present invention preferably contains the following units:

wherein each $R^1$ is independently selected from the group of hydrogen and an aliphatic group (preferably having 1 to 4 carbon atoms), each X is independently selected from the group of hydrogen; a hydroxyl group; a halide; an alkylene, an alkenylene, an arylene group, or mixture thereof, having a terminal hydroxyl group;

—O—$R^5$; and —$R^6$; wherein each $R^4$, $R^5$, and $R^6$ is independently selected from the group of an aliphatic group, an aromatic group and mixtures thereof; and wherein each $R^3$ is independently a divalent organic linking group; m is 0 or 1; q is about 5 or more; and each Y is independently a functionality capable of being ionized or the ioinized form thereof. Thus, each Y is independently capable upon neutralization of dispersing (preferably, solubilizing) the polymer in water. The relative proportion of the units in a polymer according to the present invention is as follows: x is about 0 to about 70; y is about 5 to about 95; and z is about 5 to about 50; wherein x, y and z each represent mole percent.

As stated above, the water solubilizing group contains a functionality, labeled Y, that is capable of being ionized (such as an acidic group) or is the ionic form thereof that may be anionic or cationic. Examples of suitable anionic groups, which may be formed from acidic groups, include an anion selected from the group of —$OSO_2O^-$, —$SO_2O^-$, —$CO_2^-$, (—O)$_2$P(O)O$^-$; —OP(O)(O$^-$)$_2$, —P(O)(O$^-$)$_2$, —P(O$^-$)$_2$, and —PO(O$^-$)$_2$. Examples of suitable cationic groups include organo-ammonium groups that include a cation selected from the group of —NH($R^8$)$_2^+$ and —N($R^8$)$_3^+$, wherein $R^8$ is selected from the group of a phenyl group; a cycloaliphatic group; and a straight or branched aliphatic group having about 1 to about 12 carbon atoms. Preferably, $R^8$ is a lower alkyl group of about 1 to about 4 carbon atoms.

A polymer according to the invention may be used in compositions that are suitable as release coatings for use in adhesive articles, such a tapes, bandages, labels, to name a few. The release coating compositions of the present invention are capable of being dispersed and coated out of water, although they can also be dispersed and coated out of organic solvents or mixtures of organic solvents and water. As used herein, a "water dispersible" composition includes within its scope a composition that is only dispersible, partially soluble, or readily soluble in water.

Polymeric Backbone Components

A polymer according to the invention includes a backbone of repeating ethylene containing (e.g., vinyl-derived) units having substituents attached thereto, as shown above. A polymer according to the invention can be made by a variety of known methods. Preferably, it is made by modifying the polymeric backbone component by adding isocyanate-containing hydrocarbons and water solubilizing groups, both as shown above. For example, a polymeric backbone component preferably includes repeating ethylene containing units, such as a polyethylene, wherein the polymer has at least one pendant hydroxyl group attached thereto. This can be either purchased or prepared from smaller units (i.e., precursors).

For example, the polymeric backbone can be formed from one or more precursors including, but not limited to, the group of ethylene, vinyl halides (e.g., vinylidene chloride), vinyl ethers (e.g., vinyl propyl ether), vinyl esters (e.g., vinyl acetate), acrylic esters (e.g., methyl acrylate), methacrylic esters (e.g., ethyl methacrylate), acids such as acrylic acid and methacrylic acid, amides (e.g., acrylamide), aromatic vinyl compounds (e.g., styrene), heterocyclic vinyl monomers, allyl compounds, esters and half esters of diacids (e.g., diethyl maleate), and mixtures thereof Of these, those that do not contain acrylate groups are the more preferred.

Preferred polymeric backbone components are prepared from polymerizing and copolymerizing vinyl esters to afford, for example, polyvinyl acetate and ethylene/vinyl acetate copolymer, both fully or partially hydrolyzed, to form a polyvinyl alcohol. Some commercially available materials may retain acetate groups. These materials are also referred to herein as vinyl-derived and are preferably non-acrylate derived.

Accordingly, a preferred backbone unit, prior to modification by an isocyanate containing hydrocarbon and a water solubilizing compound, in a polymer according to the invention has the formula:

wherein in the polymer each $R^1$ is independently selected from the group of hydrogen and an aliphatic group. Each X moiety is preferably independently selected from the group of hydrogen; a hydroxyl group; a halide; an alkylene, an alkenylene, an alkynylene, an arylene group, or mixtures thereof, having a terminal hydroxyl group;

—O—$R^5$; and —$R^6$; wherein each $R^4$, $R^5$, and $R^6$ are independently selected from the group of an aliphatic group, an aromatic group, and mixtures thereof, with the proviso that at least one of the X substituents on the polymeric backbone is a hydroxyl group (prior to modification). It will be understood by one of skill in the art that because each $R^1$ and X groups is independently selected from the above lists, the polymeric backbone component (prior to modification) may contain more than one type of unit. This is also true for the polymer according to the invention. One skilled in the art will further recognize that if X contains an alkylene, an alkenylene, an alkynylene group, an arylene group, or mixtures thereof having a terminal hydroxyl group, then that is the point of modification, and the resultant polymer will have a respective intervening group between the backbone and oxygen link.

Isocyanate-containing Hydrocarbons

As mentioned above, a composition according to the invention includes a polymer formed from modification of an ethylene-containing, preferably a vinyl-derived, backbone, as described above, with certain isocyanate-containing hydrocarbons. These hydrocarbons are also referred to herein as "hydrocarbon isocyanates." For example, reaction of a polyvinyl alcohol with an isocyanate results in the modification of hydroxyl groups on the backbone to urethane (or carbamate) groups. Preferably, the urethane links long side chain hydrocarbons which terminate with methyl groups.

Preferably, these isocyanate-containing hydrocarbons are capable of forming urethane linked nitrogen-bonded hydrocarbon side chains having more than about 5 carbon atoms in length and a terminal methyl group. More preferably, the nitrogen bonded hydrocarbon side chains have at least about 12 carbon atoms, even more preferably at least about 14 and, most preferably, at least about 16 carbon atoms in length. The length of the hydrocarbon side chain affects the melting point of the polymer prepared therefrom, as taught by Dahlquist et al. (See e.g., U.S. Pat. No. 2,532,011). If the length of the hydrocarbon side chain is too short, i.e., less than about 5, the long chain monomer does not crystallize at room temperature, and consequently, the side chain does not contribute to the release properties of the polymer prepared therefrom.

Typically, hydrocarbon isocyanates have the general formula:

where q preferably has a value of more than about 5, more preferably, at least about 12, even more preferably at least about 14, and most preferably, at least about 16. One preferred hydrocarbon isocyanate for use in the present invention has the formula:

(octadecyl isocyanate) which has 18 carbons in the nitrogen-linked alkyl chain. When, for example, this is reacted with polyvinyl acetate (partially or fully hydrolyzed), the resulting N-octadecyl carbamate side chains have the structure indicated by the formula:

where the carbon atom at the extreme right is one of those in the backbone, wherein each $R^1$ is independently hydrogen or an aliphatic group. The nitrogen-linked group need not be a continuous aliphatic hydrocarbon chain, and may include other atoms or radicals capable of being present in the isocyanates, provided that they do not interfere with the desired release property of the polymer formed therefrom and that they permit a nitrogen-linked side chain which terminates with an alkyl group more than 5 carbon atoms in length having a terminal methyl group.

Accordingly, one preferred unit in a polymer of the present invention having a urethane linked nitrogen-bonded hydrocarbon side chain having about 5 carbon atoms or more in length and a terminal methyl group attached thereto is:

wherein q is about 5 or more, each $R^1$ is independently selected from the group of hydrogen and an aliphatic group and y is about 5 to about 95 mole percent of the polymer.

Water Solubilizing Compounds

Water solubilizing groups preferably include functionalities capable of being ionized or are the ionic form thereof. These water solubilizing groups are hydrophilic so that when present in the polymer, they assist in solubility or dispersibility of the polymer in water and likely enhance the stability of aqueous water dispersions of the polymer. Typically, urethanes with long hydrocarbon side chains are hydrophobic and not readily water dispersible. Thus, a water solubilizing group may be incorporated in a polymer, in a nonionized form, that subsequently ionizes with the addition of a salt forming compound allowing the polymer to be dispersed in water.

It is preferred to incorporate such water solubilizing groups into a polymer in accordance with the invention by means of a water solubilizing compound. "Water solubilizing compound" refers to a compound that has a water solubilizing group, as defined above, and is capable of being attached to the polymeric backbone via an oxygen linkage, preferably an ester linkage. Therefore, a water solubilizing compound may have the water solubilizing group in an ionized or a nonionized form. For example, a carboxylic acid group is an acidic water solubilizing group that can be ionized by salt formation, for instance, by reaction with a base.

The water solubilizing groups preferably are derivatives of carboxylic acids and more preferably, derivatives of cyclic anhydrides. Most preferred water solubilizing groups may include aromatic moieties or alkyl chains that may be saturated or unsaturated, and linear or branched. Examples of preferred water solubilizing compounds that form water solubilizing groups, when attached to the polymer backbone, are succinic anhydride, maleic anhydride, glutaric anhydride, phthalic anhydride, and 2-sulfobenzoic acid cyclic anhydride. Other water solubilizing compounds include those capable of reacting with the polymeric backbone component to form pendant water solubilizing groups such as halo-alkyl acids, e.g. chloroacetic acid. It is believed that the functionality on the polymer, preferably an ester linked acid group, is important for water dispersibility of the polymer because it can be neutralized by a base.

As mentioned above, water dispersibility of the polymer is preferably accomplished by ionization of the water solubilizing group, preferably by the formation of a salt by the water solubilizing group. That is, the nonionized form of the water solubilizing group is soluble in an organic solvent (such as toluene) while the salt (or ionized) form of the water solubilizing group is dispersible in water. Thus, a salt forming compound is preferably selected from the group of organic bases and inorganic bases. One suitable class of an organic base includes a tertiary amine compound. Suitable inorganic bases include hydroxides or carbonates of alkali metals (e.g., potassium hydroxide). More preferably, a salt forming compound is selected from the group of ammonia, ammonium hydroxide, trimethylamine, triethylamine, dimethylethanolamine, tripropylamine, triisopropylamine, tributylamine, triethanolamine, diethanolalamine, and mixtures thereof. Triethylamine is a preferred salt forming compound.

Accordingly, another preferred unit in a polymer of the present invention having a water solubilizing group attached thereto is:

wherein each $R^1$ is independently selected from the group of hydrogen or an aliphatic group, each $R^3$ is independently a divalent organic linking group, m is 0 or 1, each Y is independently a functionality capable of being ionized or the ionic form thereof, and z is about 5 to about 50 mole percent of the polymer.

Consequently, a polymer so formed possesses a desirable structure exhibiting good film forming characteristics (i.e., polymeric particles have a propensity to coalesce and form a film) as well as good surface adhesion when coated on a substrate surface. Additionally, the polymer structure possesses good release properties (e.g., release values), which are stable upon aging against pressure sensitive adhesives (PSAs). It was found that lower amounts of water solubilizing groups in the polymer appear to yield better release, particularly under high humidity conditions (as indicated by the aging experiments herein).

Optional Additives

Other compounds, or additives, may be added to compositions including the polymer according to the invention to enhance or obtain particular properties. Such compositions are particularly useful as release coatings. Thus, suitable optional additives are those that preferably do not interfere with the film forming and release properties of a release coating composition according to the invention that may account for up to about 99% by weight of the release coating composition. Optional additives are preferably selected from the group of a crosslinker; a defoamer; a flow and leveling agent; a colorant (e.g., a dye or a pigment); an adhesion promoter for use with certain substrates; a plasticizer, a thixotropic agent; a rheology modifier; a film former (e.g., a coalescing organic solvent to assist in film formation); a biocide/anti-fungal agent; a corrosion inhibitor; an antioxidant; a photostabilizer (UV absorber); and a surfactant/emulsifier; and an extender (e.g., polymeric emulsion, thickener, filler); and mixtures thereof.

Particularly useful optional additives from the group of extenders include thickeners (also referred to as wetting agents) that can be added to a release coating composition of the present invention as a cost savings measure and can be present in a release coating composition in an amount that does not significantly adversely affect release properties of a release coating so formed. Thickeners are usually cellulosic ethers that typically act by immobilization of water molecules and, consequently, can be added to increase the dispersion viscosity. Increase in dispersion viscosity is generally a function of thickener concentration, degree of polymerization, and chemical composition. An example of a suitable commercially available thickener is available under the trade designation NATROSOL from Aqualon Company, Wilmington, Del. A subset of thickeners include associative thickeners that can be added to increase viscosity. Associative thickeners typically have a hydrophilic and a hydrophobic portion in each molecule. It is believed that preferential interaction of these portions with themselves and with the polymer according to the invention form a three dimensional network structure within the dispersion. An example of a suitable commercially available associative thickener is available under the trade designation RHEOVIS CR2 from Allied Colloids, Suffolk Va.

Other useful optional additives from the group of extenders can be in the form of polymeric emulsions. An example of suitable commercially available polymer emulsion includes a vinyl acetate/ethylene copolymer emulsion from Air Products, Inc., Allentown, Pa.

Typically, conventional water-borne release coating compositions include a surfactant/emulsifier to stabilize the emulsion dispersion during polymerization and prior to coating. (See e.g., U.S. Pat. No. 5,225,480 to Tseng et al. and U.S. Pat. No. 5,516,865 to Urquiola). However, a release coating composition of the present invention is formed from a polymer that includes a water solubilizing group that is preferably a salt, as described above. In this instance, the release coating composition is preferably substantially surfactant-free. That is, a preferred release coating composition of the invention can include less than about 0.5 weight percent, more preferably less than about 0.05 weight percent, of a surfactant for the purpose of stabilizing the emulsion dispersion during polymerization. Advantageously, it has been found that by modifying the polymer with an ionized form of a water solubilizing group, a surfactant is not required for either the formation of the polymer or to enhance the stability of the polymer for producing a water borne release coating. This is significant because in certain situations, it has been found that release coatings formed from release coating compositions including a surfactant may have a surfactant residue on an exposed surface of the release coating which may interfere with release properties of the release coating.

The polymer of the present invention can be coated out of an organic solvent, water, or mixtures thereof (i.e., a carrier solvent). Preferably, it is coated out of water. Thus, compositions including a polymer in accordance with the invention may include an organic solvent when it is desired to coat the release coating composition from an organic solvent, such as aromatic hydrocarbons (e.g., toluene and xylene); esters (e.g., ethyl acetate); aliphatic hydrocarbons (e.g., heptane and hexane); alcohols (e.g., isopropanol and n-butanol); ketones (e.g., acetone and methyl ethyl ketone); and mixtures thereof. Other organic solvents that may be included are residual reaction solvents from the synthesis of the polymer, which include, preferably, N-methyl-2-pyrrolidinone, dimethylformamide, diglyme, and mixtures thereof.

Method of Making Release Coating Compositions

A release coating composition of the invention is preferably prepared by a method that includes admixing a polymeric backbone component with an isocyanate hydrocarbon and a water solubilizing compound, and inverting (or ionizing the nonionized form of a water solubilizing group) so that the release composition can be applied from an aqueous dispersion, although this need not be done if coating from an organic solvent. Typically, an admixture of a polymeric backbone component and at least one organic solvent are charged into a suitable reaction vessel. Preferred organic solvents include an aromatic hydrocarbon, N-methyl-2-pyrrolidinone, dimethylformamide, diglyme, and a mixture thereof. Examples of suitable aromatic hydrocarbon solvents include toluene and xylene. This admixture is dewatered via azeotropic distillation and then allowed to react with an isocyanate containing hydrocarbon, commonly at an elevated temperature of about 70° C. to about 140° C. until the isocyanate containing hydrocarbon is consumed, about 0.2 hour to about 12 hours. A water solubilizing compound, as defined above, is then added at an elevated temperature of about 70° C. to about 140° C. until consumption of the water solubilizing compound (about 1 hour to about 12 hours). The resulting polymer may now be used in a release coating composition with optional additives, if it is desirable to coat the release coating composition out of an organic solvent.

When the release coating composition is to be applied from an aqueous dispersion, it is converted to a water dispersible derivative thereof. Typically, this is accomplished by addition of a salt forming compound to the organic solvent dispersed polymer. A convenient method for providing an aqueous dispersion of a polymer according to the invention is to add the polymer to a mixture of an organic solvent (e.g., isopropanol), water, and a salt forming compound. The organic solvent can then be removed by distillation, for example, in a sufficient amount to form an aqueous dispersion of the polymer. While not wishing to be bound by any particular theory, it is believed that the salt forming compound neutralizes (or ionizes) the nonionized form of the water solubilizing group so as to "invert" the polymer to become water dispersible. It is further believed that the polymer remains as its inverted (or ionized) form dispersed in water, and then may revert to its original state (i.e., the water solubilizing group is in an acidic form) as the release coating composition dries on a substrate surface. Accordingly, there is no need to add surfactants/emulsifiers to achieve a stable aqueous dispersion of the polymer.

Release coating compositions provided as aqueous dispersions of the polymer, besides being economical, eliminate many problems ordinarily associated with organic solutions and dispersions such as adverse effects of the organic solvent on the surface to be coated, fire hazards, health and toxicity dangers, odor, and other environmental and safety concerns during manufacturing.

A release coating composition according to the invention may be clear, and is believed to be a solution, so that a substantially uniform film may be formed by coating at room temperature. However, a release coating composition according to the invention may be cloudy or opaque, wherein application of heat is required to coalesce particles of the release coating composition so that a substantially uniform film is formed.

Release Coated Materials

A composition of the present invention can be generally used as a release coating for a solid substrate, which may be a sheet, a fiber, or a shaped object. One preferred type of substrate is that which is used for pressure sensitive adhesive articles, such as tapes, labels, bandages, and the like. The composition may be applied to at least one major surface of suitable flexible or inflexible backing materials before drying is initiated. Useful flexible backing materials include paper, plastic films such as polypropylene, polyethylene, polyvinylchloride, polytetrafluoroethylene, polyester, polyethylene terephthalate, cellulose acetate, and the like. Backings can also be of woven fabric formed of threads of synthetic fibers or natural materials such as cotton or blends of these. Alternatively, backing materials may be nonwoven fabric such as air laid webs of synthetic or natural fibers or blends of these. In addition, suitable backings can be formed of metal, foils, or ceramic sheet material. Primers known in the art can be utilized to aid in the adhesion of the release coating composition to the substrate, although they are generally not necessary.

The desired concentration of the polymer in a release coating composition depends upon the method of coating and upon the desired final coating thickness. Typically, a release coating composition is coated at about 1% to about 15% solids.

A release coating composition may be applied to a suitable substrate by means of conventional coating techniques such as wire-wound rod, direct gravure, offset gravure, reverse roll, air-knife, and trailing blade coating. The coating can be dried at room temperature, at an elevated temperature, or a combination thereof, provided that the backing material can withstand the elevated temperature. Typically, the elevated temperature is about 60° C. to about 130° C. A resulting release coating provides an effective release for a wide variety of conventional pressure-sensitive adhesives such as natural rubber-based, acrylic, tackified block copolymer, and other synthetic film-forming elastomeric materials.

Figure 1:
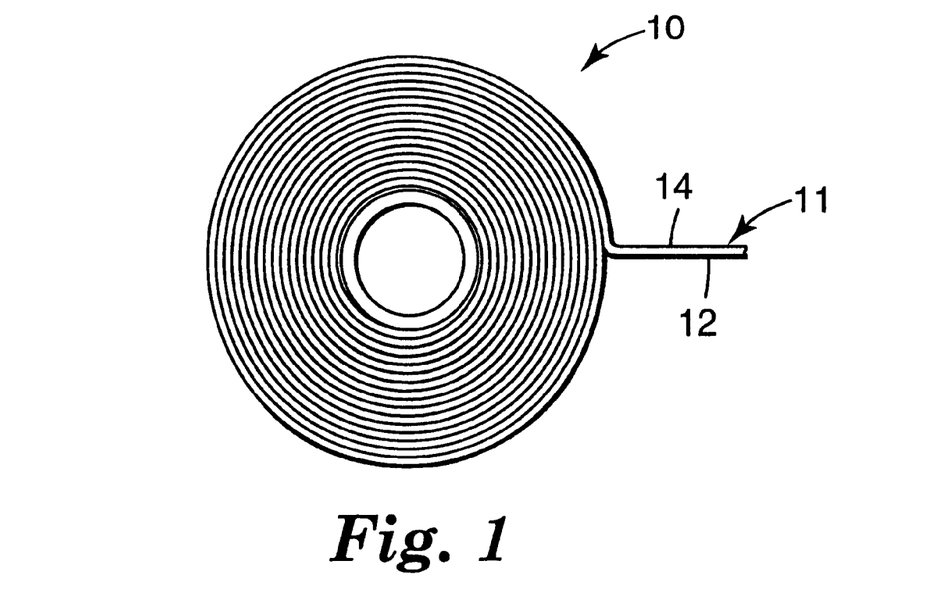
FIG. 1 is a schematic representation of a side view of an adhesive article in a roll construction according to the invention.
Figure 2:
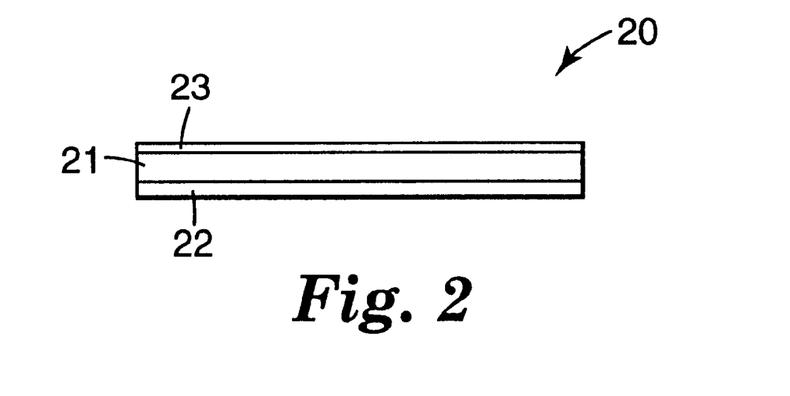
FIG. 2 is an enlarged cross-sectional view of an adhesive article in accordance with the invention.

A release coating of the present invention can be used in a variety of formats such as low adhesion backsize (LAB) for pressure-sensitive adhesive (PSA) tapes. For example, as shown in FIG. 1, a roll of tape 10 includes a flexible backing 11, a pressure sensitive adhesive coating on one major surface 12 (i.e., a first major surface) of the backing and a release coating on the opposite major surface 14 (i.e., a second major surface) of the backing. The release coating is formed from the composition described above. The tape is wound into a roll such that the pressure sensitive adhesive releasably contacts the release coating. FIG. 2 is an exploded cross-section of a segment of the tape 10 (FIG. 1). Referring now to FIG. 2, the tape 20 includes the backing 21, a pressure sensitive adhesive 22, and a release coating (or LAB) 23. The LAB 23 results in a lower specific adhesion toward the pressure sensitive adhesive than does the surface of the backing on which the pressure sensitive adhesive is coated. This permits unwinding of the tape from a roll without offsetting or transfer of the pressure sensitive adhesive from the backing. Another format is a transfer tape including a film of a pressure sensitive adhesive between two release liners, at least one being coated with the release coating composition described above.

Particularly preferred articles including a release coating (or LAB) of the invention are tapes, labels, wound dressings, and medical grade tapes. For example, one preferred wound dressing includes a polymeric film that is extremely thin, flexible, and supple such that it is conformable. The wound dressing is also typically supplied with a releasable protective liner covering the adhesive coated surface of the film. When the liner is removed and/or when the dressing is rubbed against clothing or bed linens, the LAB may prevent the adhesive coated film from wrinkling and adhering to itself and thus interfering with the smooth, aseptic application of the dressing to a patient's skin. Therefore, in addition to providing a low adhesion backsize coating on the surface of the film opposite the adhesive, it is also desirable to provide the surface with a low coefficient of friction to reduce edge lift of the dressing when rubbed against bed linen or clothing.

A medical grade tape, or other article, may include a release coating composition of the invention. Medical grade tapes, or other articles, are typically "breathable," in that they are moisture vapor permeable due to the use of a porous backing. Such tapes may also include a variety of characteristics, such as softness and conformability. Woven, nonwoven or knitted materials are typically used as backings in such tapes. Examples of suitable backings include nonwoven fabrics such as carded, spun-bonded, spun-laced, air-laid, and stitch-bonded fabrics; woven fabrics having sufficient stretch to benefit from the use of an elastomer; and knitted fabrics such as warp-knitted and weft-knitted materials.

Preferred backings exhibit a desired combination of properties such as moisture vapor transmission, softness, conformability, yield modulus, texture, appearance, processability, and strength. The particular combination of properties is typically determined by the desired application. For example, for many uses in the medical area, the fabric will have a low yield modulus and will be of sufficient strength for the desired application and for dispensation in a roll or pad form.

Pressure sensitive adhesives can be any of a variety of materials known and are generally applied to a backing material. Generally, pressure sensitive adhesives are used in tapes wherein a tape includes a backing (or substrate) and a pressure sensitive adhesive. A pressure sensitive adhesive adheres with no more than applied finger pressure and can be permanently tacky. Pressure sensitive adhesives can be used with primers, tackifiers, plasticizers, and the like. The pressure sensitive adhesives are preferably sufficiently tacky in their normal dry state, and have a desired balance of adhesion, cohesion, stretchiness, elasticity and strength for their intended use.

Tapes can be used in a wide variety of applications such as to adhere two surfaces together (e.g., flaps of packing material) or in the medical area (e.g., wound dressings). In the latter case, a pressure sensitive adhesive is a coating on the skin-facing side of the backing. Such adhesives are preferably "hypoallergenic" in that they exhibit acceptable performance in the 21-day Draize test on human subjects.

EXAMPLES

The objects, features and advantages of the present invention illustrated in the following examples, which incorporate particular materials and amounts, should not be construed to unduly limit this invention. All materials are commercially available from Aldrich Chemical, Milwaukee, Wis., unless otherwise stated or apparent. All parts, percentages, ratios, etc., in the examples are by weight unless otherwise indicated.

NMR Test Method

A sample of a polymer according to the invention (100 mg) was dissolved with heat in 1 g of deuterated chloroform. The sample was then loaded into a Varian INOVA 400 MHz Spectrometer (Varian NMR Instruments, Palo Alto, Calif.).

Peel Strength Test Method

This test measures the effectiveness of the release coating composition after a period of aging at room temperature or at an elevated temperature and at varying humidity conditions. The initial or aged release value is a quantitative measure of the force required to remove a flexible PSA tape from a substrate coated with the test composition at a specific angle and rate of removal. The force is expressed in Newtons (N) per 100 mm.

Water dispersions of the release coating compositions were coated onto 40-micron thick, flame-treated biaxially oriented polypropylene substrates using a #3 or #6 Mayer Bar. The coatings were dried in an oven and then allowed to cool in a constant temperature room. Dried release coatings had a thickness of approximately 0.1–0.2 microns. The dried coatings were conditioned (or aged) at room temperature and 50% relative humidity for 24 hours.

Aged release testing was conducted by rolling down 2.54 cm by 20 cm strips of a PSA tape onto the release coatings with 6 passes of a 2-kg rubber roller. The PSA tape/release coated film composites were allowed to age for the desired time/temperature conditions and were then adhered to a glass plate of a slip/peel tester (Model 3M90, IMASS Inc., Hingham, Mass.) with double coated tape. The force required to peel the test tape at a peel rate of 230 cm/minute at a 180° peel angle from the release coating was then measured.

Readhesion to Glass Test Method

Readhesion to glass was measured by adhering the freshly peeled tape (from the above Peel Strength Test Method) to a clean glass plate and measuring the peel adhesion in normal fashion using the same slip/peel tester (Model 3M90, IMASS Inc., Hingham, Mass.) from above, again peeling at 230 cm/min and at a 180° peel angle. A 2-kg roller was used to roll down the tape onto the glass plate, and the readhesion was measured immediately without further dwell time. These measurements were taken to determine whether a drop in the adhesion value occurred due to undesirable contamination of the adhesive surface by the release coating. Readhesions are reported as the force (N/100 mm) required to remove the aged sample from a clean glass plate. The force to peel a control tape sample (which had not been adhered to the release coating) from a clean glass plate was also measured.

"Unwind" and "Adhesion to Glass" Test Methods

Unwind was measured by attaching a tape roll to a spool fixture of a slip/peel tester (Model 3M90, IMASS Inc., Hingham, Mass.) and the force required to unwind the tape from the tape roll was measured at a peel rate of 31 cm/minute at a 90° angle with respect to the tape roll. The adhesion to glass was measured as described above in the Readhesion to Glass Test except that the tape sample was derived from a tape roll.

Example 1

This example describes the preparation, purification and recovery of a polymer having an acidic water solubilizing group according to this invention starting with a 98% hydrolyzed (by mole) polyvinyl acetate.

The following ingredients were charged into a 250-ml round bottom flask: a polymeric backbone component of a medium MW polyvinyl alcohol prepared by hydrolyzing (98% by mole) polyvinyl acetate available under the trade designation ELVANOL 71-30 from Dupont, Wilmington, Del. (5 g, 113.5 mmoles), N-methyl-2-pyrrolidinone solvent (80 ml), and toluene (20 ml). With heating and stirring, 19 ml of volatiles was distilled from the solution. The solution was placed in an oil bath at 125° C. and an isocyanate-containing hydrocarbon, octadecyl isocyanate, available under the trade designation MONDUR O. Bayer Chemical Co., Leverkusen, Germany) (21.8 g, 73.8 mmoles) was then added over 5 minutes. After stirring for 15 additional minutes, a water solubilizing compound, glutaric anhydride, (6.7 g, 58.8 mmoles) and diisopropylethylamine (7.55 g, 58.8 mmoles) were added sequentially and the solution was allowed to stir at 125° C. for 5 hours. Work-up consisted of adding acetic acid (6 g, 100 mmoles), isopropyl alcohol (80 ml), and then methanol (100 ml) to precipitate out the product. Additional purification was accomplished by redissolving the product in isopropyl alcohol (80 ml) and then precipitating with the addition of methanol (40 ml). After drying, the product was isolated as a beige solid (28.7 g).

Typical chemical shifts for Example 1 are shown by NMR analysis using methodology described above. $^1$H-NMR (CDCl$_3$, 400 MHz) delta 4.7–5.2 (at least two overlapping broad peaks, NH resonances of the urethane and R—OCH backbone resonances where R is not H), 3.8 (broad, OH of the alcohol), 3.7 (broad, HO—CH on backbone), 3.1 (broad, NHCH$_2$ methylene attached to urethane), 2.4 (broad, OOCCH$_2$CH$_2$CH$_2$COOH methylenes attached to carbonyls on the water solubilizing group), 1.1–2.0 (multiple peaks dealing with the methylene hydrogens), 0.88 (triplet, CH$_3$ terminal methyl group of urethane linked nitrogen-containing long chain alkyl substituent). Thus, integration of signals obtained by NMR analysis showed the Alkyl/Acid/OH molar ratio to be 70/22/8.

Example 2

This example describes the preparation, purification and recovery of a polymer having an acidic water solubilizing group according to this invention starting with a 98% hydrolyzed (by mole) polyvinyl acetate.

The following ingredients were charged into a 1000-ml round bottom flask: a polymeric backbone component of a low MW polyvinyl alcohol prepared by hydrolyzing (98% by mole) polyvinyl acetate available under the trade designation AIRVOL 103 from Air Products, Allentown, Pa. (30 g), N-methyl-2-pyrrolidinone solvent (420 ml), and toluene (330 ml). With heating and stirring, 227 ml of volatiles was distilled from the solution. The solution was placed in an oil bath at 100° C. and an isocyanate-containing hydrocarbon, octadecyl isocyanate (145.1 g) was then added over 3 minutes. After stirring for 15 additional minutes, a water solubilizing compound, glutaric anhydride, (17.99 g) and diisopropylethylamine (22.2 g) were added sequentially and the solution was allowed to stir at 90° C. for 5 hours. Work-up consisted of filtering the hot solution over diatomaceous earth and then precipitating with the addition of methanol (900 ml). After drying, the product was isolated as a white solid (150 g).

Typical chemical shifts for Example 2 were exemplified as recited for Example 1, except that the mole percent ratio of the alkyl, acid and alcohol portions of the polymer in Example 2 were derived from integration of the signals located at 0.88, 2.4, and 3.7 ppm, respectively, in the spectrum. Thus, integration of signals obtained by NMR showed the Alkyl/Acid/OH molar ratio to be 67/11/22.

Example 3

This example describes the preparation, purification and recovery of a polymer having an acidic water solubilizing group according to this invention starting with a 50% hydrolyzed (by mole) polyvinyl acetate.

The following ingredients were charged into a 250-ml round bottom flask: a polymeric backbone component of a polyvinyl alcohol prepared by hydrolyzing (50% by mole) polyvinyl acetate available under the trade designation POLYVIOL W45-450 from Wacker Chemie GmbH, Munich, Germany (2.5 g, 18.73 mmoles) and xylenes solvent (60 ml). With heating and stirring, 10 ml of volatiles was distilled from the solution. An isocyanate-containing hydrocarbon, octadecyl isocyanate, (3.92 g, 13.3 mmoles) was added and the solution was heated to reflux for 3 hours. A water solubilizing compound, succinic anhydride, (0.543 g, 5.42 mmoles) and triethylamine (0.60 g, 5.9 mmoles) were added sequentially and the solution was heated to reflux for 4 hours. Work-up consisted of adding isopropyl alcohol (50 ml) and then precipitating by pouring into a solution of methanol (100 ml) and acetic acid (10 g). Additional purification was accomplished by redissolving the product in isopropyl alcohol (10 ml) and then precipitating with the addition of methanol (20 ml). After drying, the product was isolated as a fluffy white solid.

Typical chemical shifts for Example 3 were exemplified as recited for Example 1, except that the mole percent ratio of the alkyl, acid and alcohol portions of the polymer in Example 3 were derived from integration of the signals located at 0.88, 2.4, and 3.7 ppm, respectively, in the spectrum. Thus, integration of signals obtained by NMR showed the Acetate/Alkyl/Acid/OH molar ratio to be 52/35/10/3.

Example 4

This example describes the preparation, purification and recovery of a polymer having an acidic water solubilizing group according to this invention starting with a fully hydrolyzed ethylene/vinyl acetate copolymer.

The following ingredients were charged into a 250-ml round bottom flask: a polymeric backbone component of an about 40,000 MW "ethylene vinyl alcohol" copolymer prepared by fully hydrolyzing an ethylene (44% by mole)/vinyl acetate copolymer available under the trade designation EVAL E 105A (EVALCA Co., Lisle, Ill.) (1 g, 15.13 mmoles), diglyme solvent (15 ml), and xylenes (7.5 ml). With heating and stirring, 8.5 ml of volatiles was distilled from the solution. An isocyanate containing hydrocarbon, octadecyl isocyanate, (2.91 g, 9.85 mmoles) was added and the solution was heated to reflux for 3.5 hours. A water solubilizing compound, succinic anhydride, (0.58 g, 5.8 mmoles) and diisopropylethylamine (0.75 g, 5.8 mmoles) were added sequentially and the solution was heated to reflux for 5 hours. Work-up consisted of adding isopropyl alcohol (7 ml) and then precipitating by pouring into a solution of methanol (15 ml) and acetic acid (1.5 g). After drying, the product was isolated as a fluffy white solid.

Typical chemical shifts for Example 4 were exemplified as recited for Example 1, except that the mole percent ratio of the alkyl, acid and alcohol portions of the polymer in Example 4 were derived from integration of the signals located at 0.88, 2.4, and 3.7 ppm, respectively, in the spectrum. Thus, integration of signals obtained by NMR showed the Alkyl/Acid/OH molar ratio to be 64/30/6.

Example 5

This example describes the preparation of a polymer according to this invention dispersed in water formed from the polymer of Example 1, wherein the water solubilizing group is neutralized to form a water dispersible polymer.

The polymer product of Example 1 (25 g) was dissolved in isopropanol (50 g) and a salt forming compound, triethylamine, (6 g) by heating at reflux for about 5 minutes. With vigorous stirring, a 1:1 water/isopropanol mix (20 g) was slowly added to the still hot solution and then water (500 g) was added over 3 minutes. Using a rotoevaporater, 95 g of liquid was removed and then the solution was filtered over diatomaceous earth. The resulting solution was a slightly yellow, transparent, 5% dispersion of the polymeric composition in water.

Example 6

This example describes the preparation of a polymer having a neutralized water solubilizing group according to this invention dispersed in water by starting with a 98% hydrolyzed (by mole) polyvinyl acetate.

A polymeric backbone component of a low molecular weight polyvinyl alcohol prepared by hydrolyzing (98% by mole) polyvinyl acetate available under the trade designation AIRVOL 103 (100 g) and N-methyl-2-pyrrolidinone solvent (333 g) were added to a vessel equipped with a mechanical stirrer (glass rod, teflon blade) and a Dean/Stark trap with a nitrogen inlet. The mixture was heated in an oil bath at 125° C. for 30 minutes with stirring to dissolve the polyvinyl alcohol. Heptane (enough to fill the Dean/Stark trap plus 50 ml) was added and the mixture heated at reflux to dewater the solution (30 minutes). The heptane was then distilled off to redissolve the polymer (about 30 minutes). An isocyanate-containing hydrocarbon, octadecyl isocyanate, (484 g) was added over about 5 minutes to the solution with stirring. After about 30 minutes, a water solubilizing compound, solid glutaric anhydride, (34.9 g) was added all at once with stirring. After about 4.5 hours, the solution was cooled to 100° C. and methanol (1500 ml) was added with stirring. The mixture was heated at reflux and stirred for 5 minutes and the liquid portion then decanted off while still hot. This step was repeated using 1400 ml of methanol, and the methanol then removed by distillation at 125° C. Isopropyl alcohol (2500 g) and a salt forming compound, triethylamine, (34.1 g) were added and the resulting mixture heated at reflux until the solid product was dissolved. With rapid stirring, hot deionized water (80° C., 5570 ml) was added over 1 minute and the solution heated at reflux to distill off 3531 g of liquid. The pH of the resulting solution was adjusted to 8 with triethylamine and the solution filtered over diatomaceous earth. The resulting 12% dispersion of polymeric composition in water was slightly yellow/transparent to beige/cloudy in appearance.

Typical chemical shifts for Example 6 were exemplified as recited for Example 1, except that the mole percent ratio of the alkyl, acid and alcohol portions of the polymer in Example 6 were derived from integration of the signals located at 0.88, 2.4, and 3.7 ppm, respectively, in the spectrum. Thus, integration of signals obtained by NMR showed the Alkyl/Acid/OH molar ratio to be 71/12/17.

Example 7

This example describes the preparation of a polymer having a neutralized water solubilizing group according to this invention dispersed in water starting with a 98% hydrolyzed (by mole) polyvinyl acetate.

A polymeric backbone component of a low molecular weight polyvinyl alcohol prepared by hydrolyzing (98% by mole) polyvinyl acetate available under the trade designation AIRVOL 103 (8.7 parts) and N-methyl-2-pyrrolidinone solvent (29.1 parts) were added to a vessel equipped with a mechanical stirrer and a decanter trap. The mixture was heated at 125° C. for 30 minutes with stirring to dissolve the polyvinyl alcohol. Heptane (enough to fill the Dean/Stark trap plus 50 ml) was added and the mixture heated at reflux to dewater the solution (30 minutes). The heptane was then distilled off to redissolve the polymer (about 30 minutes). An isocyanate-containing hydrocarbon, octadecyl isocyanate, (42.2 parts) was added over about 3 minutes to the solution with stirring. After about 30 minutes, a water solubilizing compound, solid glutaric anhydride, (3 parts) was added all at once with stirring. After about 4.5 hours, the solution was cooled to 100° C. and propylene glycol (65 parts) and deionized water (120 parts) were added with stirring. The mixture was heated at reflux and stirred for 10 minutes and the liquid portion then decanted off while still hot (about 50° C.). This step was repeated using 300 parts of deionized water. Isopropyl alcohol (150 parts) and a salt forming compound, triethylamine (3 parts), and water (150 parts) were added and the solution was heated at reflux to distill off 135 parts of liquid. The pH of the resulting dispersion was adjusted to 8 with triethylamine and the milky dispersion (24.7% solids) was drained from the vessel. A portion (97.2 parts) of this dispersion was added back into the vessel along with deionized water (173.4 parts), isopropanol (113.4 parts), and triethylamine (0.09 parts). The solution was heated at reflux for 30 minutes to distill off 150 parts of liquid and then filtered through two 20-micron filters to yield an 11% solids milky white dispersion that was then diluted with the addition of deionized water to give a 10% solids dispersion.

Typical chemical shifts for Example 2 were exemplified as recited for Example 1, except that the mole percent ratio of the alkyl, acid and alcohol portions of the polymer in Example 2 were derived from integration of the signals located at 0.88, 2.4, and 3.7 ppm, respectively, in the spectrum. Thus, integration of signals obtained by NMR showed the Alkyl/Acid/OH molar ratio to be 75/11/14.

Examples 8–22

Additional polymeric compositions of this invention were prepared according to the above examples with minor variations in reactant amounts and reaction conditions. Polymeric compositions in Examples 8–12 were prepared as in Example 1. Polymeric compositions in Examples 13–14 were prepared as in Example 2. Polymeric compositions in Examples 15–22 were prepared as in Example 3. The NMR-determined molar ratios of the resulting polymers are provided in Table 1.

TABLE 1

| | "Polyvinyl Alcohol" | Molar Ratio | | | |
|---|---|---|---|---|---|
| Ex. | Starting Material | Acetate | Alkyl | Acid | OH |
| 8 | ELVANOL 71-30 | 1 | 64 | 35 | 0 |
| 9 | ("98% Hydrolyzed" Polyvinyl Acetate) | 1 | 69 | 10 | 20 |
| 10 | ELVANOL 50-42 (Dupont) ("88% Hydrolyzed, High MW" Polyvinyl Acetate) | 12 | 68 | 14 | 06 |
| 11 | ELVANOL 51-05 (Dupont) | 12 | 65 | 15 | 08 |
| 12 | ("88% Hydrolyzed, Low MW" Polyvinyl Acetate) | 12 | 62 | 20 | 06 |
| 13 | POLYVIOL W45-450 | 51 | 36 | 4 | 9 |
| 14 | ("50% Hydrolyzed" Polyvinyl Acetate) | 51 | 28 | 6 | 15 |
| 15 | EVAL E 105A | 0 | 45 | 42 | 13 |
| 16 | ("Fully Hydrolyzed" "44% | 0 | 76 | 10 | 14 |

TABLE 1-continued

| | "Polyvinyl Alcohol" | Molar Ratio | | | |
|---|---|---|---|---|---|
| Ex. | Starting Material | Acetate | Alkyl | Acid | OH |
| 17 | Ethylene"/Vinyl Acetate | 0 | 59 | 39 | 2 |
| 18 | Copolymer) | 0 | 81 | 4 | 15 |
| 19 | | 0 | 57 | 26 | 17 |
| 20 | | 0 | 42 | 6 | 52 |
| 21 | | 0 | 36 | 4 | 60 |
| 22 | EVAL L 101(EVALCA) ("Fully Hydrolyzed" "27% Ethylene"/Vinyl Acetate Copolymer) | 0 | 80 | 13 | 7 |

Example 23

The feasibility of coating polypropylene film with a water-dispersible release coating composition containing a water dispersible polymer having a neutralized water solubilizing group and an associative thickener additive was demonstrated in this example.

An associative thickener, a 30% aqueous dispersion available under the trade designation RHEOVIS CR2 (Allied Colloids, Suffolk Va.) (0.068 g), was added to 10 g of a 10% water dispersion of the water dispersible polymer prepared in Example 7. The mixture was stirred for about 5 seconds and the resulting solution hand coated onto a 15 cm×60 cm sheet of 50-micron, flame-treated, biaxially oriented polypropylene (BOPP) film with a #6 Mayer Bar (RDS Specialties, Webster, N.Y.) which spread the solution evenly over the film. The film was dried at 110° C. for about 1 minute in a drying oven to afford a clear-coated film.

Example 24

The feasibility of coating polypropylene film with a water-dispersible release coating composition containing a polymer having a neutralized water solubilizing group and a viscosity modifier additive was demonstrated in this example.

A 0.5% aqueous dispersion of a viscosity modifier available under the trade designation NATROSOL (Aqualon Company, Wilmington, Del.) (9.38 g) was added to 10 g of a 10% water dispersion of the polymer prepared in Example 7. The mixture was stirred for about 5 seconds and the resulting solution hand coated onto a 15 cm×60 cm sheet of 50-micron, flame-treated, BOPP film with a #6 Mayer Bar which spread the solution evenly over the film. The film was dried at 110° C. for about 1 minute in a drying oven to afford a clear-coated film.

Example 25

The feasibility of coating cellulose acetate film with a water-dispersible release coating composition containing a polymer having a neutralized water solubilizing group and no additives was demonstrated in this example.

A 12% water dispersion (about 0.25 ml) of the polymeric composition prepared in Example 6 was hand coated onto a 15 cm×60 cm sheet of matte-finished cellulose acetate film with a #6 Mayer Bar which spread the solution evenly over the film. The film was dried at ambient conditions for about 15 minutes to afford a clear-coated film.

Examples 26–28

These examples describe the testing of various PSA tapes applied to a polypropylene substrate coated with a blend of a water-dispersible release coating composition of a polymer having a neutralized water solubilizing group and a water-borne film former that alone does not provide a release surface.

A 55% aqueous emulsion of a film former (a vinyl acetate/ethylene copolymer emulsion available under the trade designation AIRFLEX 100HS from Air Products, Inc., Allentown, Pa.) (8.2 g) was added to 5 g of a 10% water dispersion of the polymer prepared in Example 7. Water (86.8 g) was added to provide a solution containing 5% solids which was then hand coated using a #6 Mayer Bar onto BOPP and tested for peel strength and readhesion to glass using 3 commercial pressure sensitive adhesive (PSA) tapes according to the Peel Strength and Readhesion Test Methods described above. The different commercially available tapes (all from 3M Company, St. Paul, Minn.) were evaluated and the test results are provided in Table 2.

TABLE 2

| | | Peel Strength (N/100 mm) | | | Readhesion to Glass |
|---|---|---|---|---|---|
| Exp. | Tape Sample | Initial | 1 Week at (21° C./ 50% RH) | 1 Week at (50° C./ 50% RH) | (N/100 mm) (1 wk at 50° C.) |
| 26 | SCOTCH Brand MAGIC Tape (3M Company, St. Paul, MN) | 2.88 | 5.17 | 4.67 | 37 (Control = 27) |
| 27 | SCOTCH Brand CRYSTAL CLEAR Tape (3M Company, St. Paul, MN) | 5.50 | 5.81 | 5.50 | 30 (Control = 28) |
| 28 | SCOTCH Brand SATIN Tape (3M Company, St. Paul, MN) | 5.33 | 7.80 | 5.20 | 23 (Control = 22) |

Desired target peel strength for the tapes in Table 2 range from 4 to 8 N/100 mm. The data in Table 2 show that the tapes in Examples 26–28 display release and readhesion from this range of acrylate adhesive tapes.

Example 29

This example describes the preparation and testing of a backing material suitable for use as a wound dressing tape coated with a water-dispersible release coating composition of a polymer of Example 2 having an acidic water solubilizing group. An aqueous dispersion of the polymer from Example 2 was prepared using the method of Example 5 except that the amount of water was adjusted to result in an 8% solids dispersion.

An 8% solids aqueous dispersion of the polymeric composition described in Example 2 was coated onto a porous, nonwoven fibrous tape material prepared in accordance with the description found in U.S. Pat. No. 3,121,021 (Copeland) that did not yet have a release coating. The coating was accomplished via a nipped gravure station using a 90 line ruling mill gravure roll and the residence time in a 130° C. drying oven was 10 seconds. The resulting tape roll was then aged at various conditions and tested for unwind and adhesion to glass according to the methods described above. Test results are compared with results from commercially available MICROPORE Tape (3M Company, St. Paul, Minn.) in Table 3.

TABLE 3

| Tape Sample | Unwind (N/100 mm) | | Adhesion to Glass (N/100 mm) | |
| --- | --- | --- | --- | --- |
| | 11 Days at 50° C./ "Dry" | 14 Days at 50° C./ 90% RH | After 11-Day Aging | After 14-Day Aging |
| Nonwoven/porous Tape | 3.3 | 14.2 | 23.0 | 18.6 |
| MICROPORE Brand Tape (Commercial Product) | 5.5 | 12.0 | 23.0 | 19.7 |

The desired peel strength of MICROPORE brand tape ranges from 3 to 18 N/100 mm. The data in Table 3 show that the test tape displays desirable release and readhesion characteristics. Noteworthy is the fact that the peel strength does not increase prohibitively with aging. The readhesion does decrease somewhat but is comparable to the commercially available product.

Examples 30–32

These examples describe the testing of rubber-based, Kraton-based, and acrylic-based PSA tapes applied to a polypropylene substrate coated with various water-dispersible release coating compositions.

Aqueous dispersions of the polymers from Examples 1 and 4 were prepared using the method of Example 5 except that the amount of water added was adjusted to result in 10% solids dispersons. These water-borne release coating compositions were hand coated onto aminated butadiene primed polyester film using a #3 Mayer Bar and tested for Peel Strength and Readhesion to glass using 3 commercial PSA tapes according to the Test Methods described above. The different commercially available tapes (all from 3M Company, St. Paul, Minn.) evaluated and the test results are provided in Table 4.

TABLE 4

| Exp. | Tape Sample | Peel Strength (N/100 mm) | | Readhesion to Glass (N/100 mm) (After 3-Day Aged Peel) |
| --- | --- | --- | --- | --- |
| | | 3 Days at 23° C./ 50% RH | 3 Days at 50° C./ 50% RH | |
| 30 | 3M Brand #232 Masking Tape (Rubber-Based Adhesive) (Polymer from Example 1) | 21.3 | 16.6 | 43.8 (Control = 43.0) |
| 31 | SCOTCH Brand MAGIC Tape (Acrylic-Based Adhesive) (Polymer from Example 1) | 5.3 | 6.8 | 34.0 (Control = 27.0) |
| 32 | 3M Brand #375 Box Sealing Tape (Kraton-Based Adhesive) (Polymer from Example 4) | 1.9 | 2.8 | 92.0 (Control = 88.0) |

The data in Table 4 show that the tapes of Examples 30–32 displayed desirable release and readhesion from the different classes of pressure sensitive adhesives.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A release coating composition comprising a polymer comprising:
   a polyethylene backbone having substituents attached thereto, wherein the substituents comprise:
   a urethane linked nitrogen-bonded hydrocarbon side chain having about 5 carbon atoms or more in length and a terminal methyl group; and
   an oxygen linked water solubilizing group.

2. The release coating composition of claim 1 wherein the substituents further comprise hydrogen; a hydroxyl group; a halide; an alkylene, an alkenylene, an alkynylene, an arylene group, or mixtures thereof, having a terminal hydroxyl group;

—O—$R^5$; —$R^6$; or mixtures thereof;
wherein each $R^4$, $R^5$, and $R^6$ is independently selected from the group of an aliphatic group, an aromatic group, and mixtures thereof.

3. The release coating composition of claim 1 wherein the water solubilizing group comprises an anionic group comprising an anion selected from the group of —$OSO_2O^-$; —$SO_2O^-$, —$CO_2^-$, (—O)$_2$P(O)$O^-$, —OP(O)($O^-$)$_2$, —P(O)($O^-$)$_2$, —P($O^-$)$_2$, and —PO($O^-$)$_2$.

4. The release coating composition of claim 1 wherein the water solubilizing group comprises a cation selected from the group of —NH($R^8$)$_2^+$ and —N($R^8$)$_3^+$, wherein $R^8$ is selected from the group of a phenyl group; a cycloaliphatic group; and a straight or branched aliphatic group having about 1 to about 12 carbon atoms.

5. The release coating composition of claim 1 wherein the water solubilizing group comprises an acidic group capable of forming an anionic species.

6. The release coating composition of claim 1 further comprising an organic solvent selected from the group of an aromatic hydrocarbon, an ester, an aliphatic hydrocarbon, an alcohol, a ketone, and mixtures thereof.

7. The release coating composition of claim 1 further comprising an optional additive.

8. The release coating composition of claim 7 wherein the optional additive is selected from the group of a crosslinker; a defoamer; a flow and leveling agent; a colorant; an adhesion promoter; a plasticizer; a thixotropic agent; a rheology modifier; a film former; a biocide/anti-fungal agent; a corrosion inhibitor; an antioxidant; a surfactant/emulsifier; an extender; and mixtures thereof.

9. The release coating composition of claim 8 wherein the extender comprises a thickener, a polymeric emulsion, or mixtures thereof.

10. The release coating composition of claim 1 further comprising water or a mixture of water and one or more organic solvents.

11. A release coating composition comprising a polymer comprising:
   a vinyl-derived backbone having substituents attached thereto, wherein the substituents comprise:

a urethane linked nitrogen-bonded hydrocarbon side chain having about 5 carbon atoms or more in length and a terminal alkyl group; and an oxygen linked water solubilizing group;

wherein the release coating composition comprises about 0.5% by weight or less of a surfactant.

12. The release coating composition of claim 11 wherein the vinyl-derived backbone is formed from one or more precursor compounds selected from the group of ethylene, vinyl halides, vinyl ethers, vinyl esters, acrylic esters, methacrylic esters, (meth)acrylic acid, amides, aromatic vinyl compounds, heterocyclic vinyl monomers, allyl compounds, esters and half esters of diacids, and mixtures thereof.

13. The release coating composition of claim 12 wherein the vinyl-derived backbone is selected from the group of partially or fully hydrolyzed polyvinyl acetate, partially or fully hydrolyzed ethylene/vinyl acetate, and mixtures thereof.

14. The release coating composition of claim 11 wherein the water solubilizing group comprises an anionic group comprising an anion selected from the group of $-OSO_2O^-$, $-SO_2O^-$, $-CO_2^-$, $(-O)_2P(O)O^-$; $-OP(O)(O^-)_2$, $-P(O)(O^-)_2$, $-P(O^-)_2$, and $-PO(O^-)_2$.

15. The release coating composition of claim 11 wherein the water solubilizing group comprises a cation selected from the group of $-NH(R^8)_2{}^+$ and $-N(R^8)_3{}^+$, wherein $R^8$ is selected from the group of a phenyl group; a cycloaliphatic group; and a straight or branched aliphatic group having about 1 to about 12 carbon atoms.

16. The release coating composition of claim 11 further comprising an organic solvent selected from the group of an aromatic hydrocarbon, an ester, an aliphatic hydrocarbon, an alcohol, a ketone, and mixtures thereof.

17. The release coating composition of claim 11 further comprising an optional additive.

18. The release coating composition of claim 17 wherein the optional additive comprises an extender.

19. A composition for forming a release coating, wherein the composition comprises a polymer formed by combining a polymeric backbone component with an isocyanate-containing hydrocarbon having about 5 carbon atoms or more and a terminal methyl group and a water solubilizing compound.

20. The release coating composition of claim 19 wherein the water solubilizing compound is capable of forming an anionic water solubilizing group comprising an anion selected from the group of $-OSO_2O^-$, $-SO_2O^-$, $-CO_2^-$, $(-O)_2P(O)O^-$, $-OP(O)(O^-)_2$, $-P(O)(O^-)_2$, $-P(O^-)_2$, and $-PO(O^-)_2$.

21. The release coating composition of claim 19 wherein the water solubilizing compound is capable of forming a cationic water solubilizing group comprising a cation selected from the group of $-NH(R^8)_2{}^+$ and $-N(R^8)_3{}^+$, wherein $R^8$ is selected from the group of a phenyl group; a cycloaliphatic group; and a straight or branched aliphatic group having about 1 to about 12 carbon atoms.

22. A release coating composition comprising a polymer comprising units of the following formula:

wherein each $R^1$ is independently selected from the group of hydrogen and an aliphatic group; and each R is independently selected from the group of X; a urethane-linked hydrocarbon group of the formula:

wherein q is about 5 or more; and an oxygen linked water solubilizing group of the formula:

wherein each $R^3$ is independently a divalent organic linking group and m is 0 or 1; and the X moiety is selected from the group of hydrogen; a hydroxyl group; a halide; an alkylene, an alkenylene, an arylene group, and mixtures thereof having a terminal hydroxyl group;

$-O-R^5$; or $-R^6$; wherein each $R^4$, $R^5$, and $R^6$ is independently selected from the group of an aliphatic group, an aromatic group, or mixtures thereof; and further wherein each Y moiety independently comprises a functionality capable of being ionized or is the ionized form thereof; with the proviso that the polymer contains at least one each of the urethane linked hydrocarbon group and the oxygen linked water solubilizing group.

23. A release coating composition comprising a polymer comprising:

wherein each $R^1$ is independently selected from the group of hydrogen and an aliphatic group; each X is independently selected from the group of hydrogen; a hydroxyl group; a halide; an alkylene, an alkenylene, an arylene group, or mixtures thereof, having a terminal hydroxyl group;

$-O-R^5$; and $-R^6$; wherein each $R^4$, $R^5$, and $R^6$ is independently selected from the group of an aliphatic group, an aromatic group, and mixtures thereof, and wherein each $R^3$ is independently a divalent organic linking group and each Y is independently a functionality capable of being ionized or is the ionized form thereof; and further wherein q is about 5 or more; m is 0 or 1; x is about 0 to about 70; y is about 5 to about 95; and z is about 5 to about 50.

24. The release coating composition of claim 23 further comprising an organic solvent selected from the group of an aromatic hydrocarbon, an ester, an aliphatic hydrocarbon, an alcohol, a ketone, and mixtures thereof.

25. The release coating composition of claim 23 further comprising an optional additive.

26. The release coating composition of claim 25 wherein the optional additive comprises an extender.

27. A polymer comprising:
a vinyl-derived backbone having substituents attached thereto;
wherein the substituents comprise:
a urethane linked nitrogen-bonded hydrocarbon side chain having about 5 carbon atoms or more in length and a terminal alkyl group; and
an oxygen linked water solubilizing group.

28. The polymer of claim 27 wherein the vinyl-derived backbone is formed from one or more precursors selected from the group of ethylene, vinyl halides, vinyl ethers, vinyl esters, acrylic esters, methacrylic esters, (meth)acrylic acid, amides, aromatic vinyl compounds, heterocyclic vinyl monomers, allyl compounds, esters and half esters of diacids, and mixtures thereof.

29. The polymer claim 28 wherein the vinyl-derived backbone is selected from the group of partially or fully hydrolyzed polyvinyl acetate, partially or fully hydrolyzed ethylene vinyl acetate, and mixtures thereof.

30. The polymer of claim 28 wherein the water solubilizing group comprises an anionic group comprising an anion selected from the group of $-OSO_2O^-$, $-SO_2O^-$, $-CO_2^-$, $(-O)_2P(O)O^-$, $-OP(O)(O^-)_2$, $-P(O)(O^-)_2$, $-P(O^-)_2$, and $-PO(O^-)_2$.

31. The polymer of claim 28 wherein the water solubilizing group comprises a cation selected from the group of $-NH(R^8)_2^+$ and $-N(R^8)_3^+$, wherein $R^8$ is selected from the group of a phenyl group; a cycloaliphatic group; and a straight or branched aliphatic group having about 1 to about 12 carbon atoms.

32. A method for making a polymer comprising the steps of:
admixing a polymeric backbone component and at least one organic solvent;
adding an isocyanate-containing hydrocarbon having at least about 5 carbon atoms in length and a terminal methyl group to the admixture to modify the polymeric backbone component; and
adding a water solubilizing compound to the admixture to modify the polymeric backbone component.

33. The method of claim 32 wherein the polymeric backbone component is formed from one or more precursors selected from the group of ethylene, vinyl halides, vinyl ethers, vinyl esters, acrylic esters, methacrylic esters, (meth)acrylic acid, amides, aromatic vinyl compounds, heterocyclic vinyl monomers, allyl compounds, esters and half esters of diacids, and mixtures thereof.

34. The method of claim 33 wherein the polymeric backbone component is selected from the group of partially or fully hydrolyzed polyvinyl acetate, partially or fully hydrolyzed ethylene vinyl acetate, and mixtures thereof.

35. The method of claim 32 wherein the water solubilizing compound is capable of forming an anionic group comprising an anion selected from the group of $-OSO_2O^-$, $-SO_2O^-$, $-CO_2^-$, $(-O)_2P(O)O^-$; $-OP(O)(O^-)_2$, $-P(O)(O^-)_2$, $-P(O^-)_2$, and $-PO(O^-)_2$.

36. The method of claim 32 wherein the water solubilizing compound is capable of forming a cationic group comprising a cation selected from the group of $-NH(R^8)_2^+$ and $-N(R^8)_3^+$, wherein $R^8$ is selected from the group of a phenyl group; a cycloaliphatic group; and a straight or branched aliphatic group having about 1 to about 12 carbon atoms.

37. The method of claim 32 wherein the water solubilizing compound is selected from the group of succinic anhydride, maleic anhydride, glutaric anhydride, phthalic anhydride, 2-sulfobenzoic acid cyclic anhydride, and mixtures thereof.

38. The method of claim 32 wherein the at least one organic solvent is selected from the group of an aromatic hydrocarbon, N-methyl-2-pyrrolidinone, dimethylformamide, diglyme, and mixtures thereof.

39. The method of claim 32 further comprising a step of adding an optional additive selected from the group of a crosslinker; a defoamer; a flow and leveling agent; a colorant; an adhesion promoter; a plasticizer; a thixotropic agent; a rheology modifier; a film former; a biocide/anti-fungal agent; a corrosion inhibitor; an antioxidant; a surfactant/emulsifier; an extender; and mixtures thereof.

40. The method of claim 39 wherein the extender comprises a thickener, a polymeric emulsion, or mixtures thereof.

41. The method of claim 32 further comprising the steps of:
adding a salt forming compound, a solvent, and water; and
removing a sufficient amount of the organic solvent to form an aqueous dispersion of the release coating composition.

42. The method of claim 41 wherein the salt forming compound is selected from the group of ammonia, ammonium hydroxide, trimethylamine, triethylamine, tripropylamine, triisopropylamine, tributylamine, triethanolamine, diethanolamine, dimethylethanolamine, and mixtures thereof.

43. The method of claim 41 further comprising a step of adding an optional additive.

44. The method of claim 43 wherein the optional additive comprises an extender.

45. An article comprising:
a backing having a first major surface and a second major surface;
a pressure sensitive adhesive coated on the first major surface of the backing; and
a low adhesion backsize coated on the second major surface;
wherein the low adhesion backsize is formed from a release coating composition comprising a polymer comprising:
an ethylene-containing backbone having substituents attached thereto, wherein the substituents comprise:
a urethane linked nitrogen-bonded hydrocarbon side chain having about 5 carbon atoms or more in length and a terminal methyl group; and
an oxygen linked water solubilizing group.

46. An article comprising two opposed major surfaces wherein at least one of the major surfaces is coated with a release coating composition comprising a polymer prepared by the method of claim 32.

47. An article comprising two opposed major surfaces wherein at least one of the major surfaces is coated with a release coating composition comprising a polymer prepared by the method of claim 41.

48. A polymer comprising repeat units of the following formula:

wherein each $R^1$ is independently selected from the group of hydrogen and an aliphatic group; and each R is independently selected from the group of X; a urethane-linked hydrocarbon group of the formula:

wherein q is about 5 or more; and an oxygen linked water solubilizing group of the formula:

wherein the X moiety is selected from the group of hydrogen; a hydroxyl group; a halide; an alkylene, an alkenylene, an arylene group, or mixtures thereof, having a terminal hydroxyl group;

—O—$R^5$; or —$R^6$; wherein each $R^4$, $R^5$, and $R^6$ is independently selected from the group of an aliphatic group, an aromatic group, and mixtures thereof, and further wherein each $R^3$ is independently a divalent organic linking group, m is 0 or 1, and each Y moiety independently comprises a functionality capable of being ionized or is the ionized form thereof; with the proviso that the polymer contains at least one each of the urethane linked hydrocarbon group and the oxygen linked water solubilizing group.

49. The polymer of claim 48 wherein the water solubilizing group comprises an anionic group comprising an anion selected from the group of —$OSO_2O^-$, —$SO_2O^-$, —$CO_2^-$, $(—O)_2P(O)O^-$, —$OP(O)(O^-)_2$, —$P(O)(O^-)_2$, —$P(O^-)_2$, and —$PO(O^-)_2$.

50. The polymer of claim 48 wherein the water solubilizing group comprises a cation selected from the group of —$NH(R^8)_2^+$ and —$N(R^8)_3^+$, wherein $R^8$ is selected from the group of a phenyl group; a cycloaliphatic group; and a straight or branched aliphatic group having about 1 to about 12 carbon atoms.

51. A polymer comprising:

wherein each $R^1$ is independently selected from the group of hydrogen and an aliphatic group; each X is independently selected from the group of a hydrogen; a hydroxyl group; a halide; an alkylene, an alkenylene, an arylene group, or mixtures thereof, having a terminal hydroxyl group;

—O—$R^5$; and —$R^6$, wherein each $R^4$, $R^5$ and $R^6$ is independently selected from the group of an aliphatic group, an aromatic group, and mixtures thereof; and wherein each $R^3$ is independently a divalent organic linking group and each Y is independently a functionality capable of being ionized or is the ionized form thereof; and further wherein q is about 5 or more; m is 0 or 1; x is about 0 to about 70; y is about 5 to about 95; and z is about 5 to about 50.

52. The polymer of claim 51 wherein Y comprises an anion selected from the group of —$OSO_2O^-$, —$SO_2O^-$, —$CO_2^-$, $(—O)_2P(O)O^-$; —$OP(O)(O^-)_2$, —$P(O)(O^-)_2$, —$P(O^-)_2$, and —$PO(O^-)_2$.

53. The polymer of claim 51 wherein Y comprises a cation selected from the group of —$NH(R^8)_2^+$ and —$N(R^8)_3^+$, wherein $R^8$ is selected from the group of a phenyl group; a cycloaliphatic group; and a straight or branched aliphatic group having about 1 to about 12 carbon atoms.

54. An article comprising:
a porous backing having a first major surface and a second major surface;
a pressure sensitive adhesive coated on the first major surface of the backing; and
a low adhesion backsize coated on the second major surface;
wherein the low adhesion backsize is formed from a release coating composition comprising a polymer comprising:
an ethylene-containing backbone having substituents attached thereto, wherein the substituents comprise:
a urethane linked nitrogen-bonded hydrocarbon side chain having about 5 carbon atoms or more in length and a terminal methyl group; and
an oxygen linked water solubilizing group.

55. The article of claim 54 wherein the article comprises a medical tape.

56. The article of claim 54 wherein the pressure sensitive adhesive is hypoallergenic.

* * * * *

UNITED STATES PATENT AND TRADEMARK OFFICE
CERTIFICATE OF CORRECTION

PATENT NO.   : 5,990,238                                                  Page 1 of 1
DATED        : November 23, 1999
INVENTOR(S)  : DiZio et al.

It is certified that error appears in the above-identified patent and that said Letters Patent is hereby corrected as shown below:

Column 1,
Line 40, "all" should read -- alkyl --.

Column 3,
Line 31, "allyl" should read -- alkyl --.

Column 19,
Line 23, "NH" should read -- N$\underline{H}$ --; and "R-OCH" should read -- R-OC$\underline{H}$ --.
Line 24, "OH" should read -- O$\underline{H}$ --.
Line 25, "HO-CH" should read -- HO-C$\underline{H}$ --.
Line 26, "NHCH$_2$" should read -- NHC$\underline{H}_2$ --.
Line 27, "OOCCH$_2$CH$_2$CH$_2$COOH" should read -- OOCC$\underline{H}_2$CH$_2$C$\underline{H}_2$COOH --.
Line 28, "CH$_3$" should read -- C$\underline{H}_3$ --.

Column 29,
Line 39, after the phrase "making a polymer", insert -- of claim 27 --

Signed and Sealed this

Twenty-fifth Day of June, 2002

Attest:

Attesting Officer

JAMES E. ROGAN
Director of the United States Patent and Trademark Office